United States Patent [19]

Marble

[11] Patent Number: 5,512,172

[45] Date of Patent: Apr. 30, 1996

[54] METHOD FOR SEALING THE EDGE OF A FILTER MEDIUM TO A FILTER ASSEMBLY AND THE FILTER ASSEMBLY PRODUCED THEREBY

[75] Inventor: Keith S. Marble, Smith Falls, Canada

[73] Assignee: Racal Filter Technologies, Ltd., Canada

[21] Appl. No.: 259,748

[22] Filed: Jun. 10, 1994

[51] Int. Cl.⁶ .................................................. B01D 29/07
[52] U.S. Cl. ........................... 210/232; 55/497; 55/521; 156/73.1; 210/493.1
[58] Field of Search ................ 55/497, 521; 210/493.1, 210/493.3, 493.5, 232, 490, 491, 500.36; 156/73.1, 73.5; 248/110.1, 141.1, 144, 152; 29/DIG. 48

[56] References Cited

U.S. PATENT DOCUMENTS

| | | | |
|---|---|---|---|
| 1,832,281 | 11/1931 | Davies . | |
| 2,135,863 | 11/1938 | Walker . | |
| 3,392,846 | 7/1968 | Getzin | 55/521 |
| 3,397,518 | 8/1968 | Rogers . | |
| 3,815,754 | 6/1974 | Rosenberg | 210/445 |
| 3,873,288 | 3/1975 | Wachter et al. | 55/497 |
| 4,169,059 | 9/1979 | Storms | 210/493 |
| 5,167,740 | 12/1992 | Michaelis et al. | 156/73.1 |
| 5,215,609 | 6/1993 | Sanders | 156/70 |
| 5,376,270 | 12/1994 | Spearman | 55/497 |

FOREIGN PATENT DOCUMENTS

| | | |
|---|---|---|
| 170643 | 2/1986 | European Pat. Off. . |
| 2089046 | 1/1972 | France . |
| 2231409 | 12/1974 | France . |

OTHER PUBLICATIONS

International Search Report Dated Nov. 7, 1995 for PCT App. No. PCT/CA95/00345.

*Primary Examiner*—Joseph W. Drodge
*Attorney, Agent, or Firm*—Anna E. Mack; Pedro P. Hernandez

[57] ABSTRACT

Improved filter assemblies are provided having a pleated filter medium attached to a support frame utilizing an improved manufacturing method employing a welding process to seal the pleated edges of the filter medium to an inwardly protruding sealing means provided on the frame around the inside perimeter thereof, forming a final filter assembly exhibiting an essentially leak-proof edge seal.

36 Claims, 8 Drawing Sheets

METHOD FOR SEALING THE EDGE OF A FILTER MEDIUM TO A FILTER ASSEMBLY AND THE FILTER ASSEMBLY PRODUCED THEREBY

BACKGROUND OF THE INVENTION

1. Field of the Invention

This invention relates generally to filter assemblies and to improved methods for the manufacture of such filter assemblies. More particularly, this invention relates to filter assemblies having a pleated filter medium mounted within or attached to a support frame surrounding the filter medium and to improved methods utilizing a welding process to seal the edges of the filter medium to the frame around the inside perimeter thereof to form a final filter assembly exhibiting an essentially leak-proof seal.

2. Description of the Prior Art

The construction of filter assemblies containing pleated filter media enclosed within a support frame presents difficult problems in bonding the periphery of the medium to the frame. In order to obtain a useful and reliable filter assembly, it is essential that a strong, leak-proof seal be created at the filter/frame junction.

A number of techniques are currently in use for sealing a filter medium to a support frame. Most traditional methods in use confine the ends of the pleats to a rectangularly recessed channel located within the support frame. An adhesive such as urethane, hot melt, epoxy or some other adhesive is applied within the channel providing a bond between the media edge and the support frame inner perimeter. However, such adhesives are labor intensive to apply and could involve time consuming cleaning procedures. In addition, the filters thus produced may be undesirable from an environmental standpoint and the resulting filter assembly may be limited to relatively low temperature applications. Moreover, as the ends of the pleated filter medium are free to float within the frame, an uneven distribution of pleats may occur during the production process.

Some manufacturers, particularly those producing vehicular filters employ a process described as "insert molding". In this procedure, the filter medium is pleated as required, cut to size, and then placed into an injection mold tool. The plastic frame is then made by injection molding and the filter media ends are trapped and sealed within the plastic of the frame. Although this molding technique is expensive due to high tooling costs, it provides a method of manufacture which is capable of high volume production.

Various welding and swaging techniques have been used in the production of respiratory canister filter assemblies as for example, to bond fines filters and/or retainers to the bottom or side wall of a metallic canister housing. In addition, many types of disposable respirator masks use ultrasonic welding techniques for sealing the filter mask unit.

U.S. Pat. No. 3,815,754 discloses the application of ultrasonic welding to the production of plastic filter assemblies used for blood filtration. In this patent ultrasonic welding is disclosed for sealing the filter to the housing and for sealing the housing elements to each other to prevent fluid leakage to the outside of the filter assembly.

While such applications of ultrasonic welding are known within the filter manufacturing industry, such techniques have not been used for permanently affixing a pleated filter assembly to a support frame, to create a leak-proof seal along the perimeter edge of each individual pleat present in the filter assembly. Certainly, in filtering assemblies which require more than two pleats per inch to ensure sufficient filtration surface area, the ability to direct bonding energy to the desired edge surface becomes increasingly more difficult. Prior to the instant invention, it was generally believed that welding applications, and particularly ultrasonic welding, would not be capable of forming an appropriately uniform leak-proof seal. Hence, such welding techniques were not thought to be applicable for use with the densely pleated filters or filter pack assemblies in use today.

SUMMARY OF THE INVENTION

In accordance with the present invention, there is provided a filter assembly comprised of a pleated filter medium having its edges sealed within a support frame which assembly is capable of high volume production and does not require the use of adhesives such as urethane. More particularly, the present invention provides a pleated filter assembly having reinforced pleat spacing across the entire face of the filter surface.

In the present invention, a novel filter assembly is provided which is simple and economical to manufacture and assemble, which can be readily installed with a minimum of steps, which affords substantial reinforcement to a pleated filter medium to resist the deformation forces of a fluid stream passing through the filter, and which, at the same time, presents a minimum of resistance to airflow with a maximum of operating efficiency. In addition, the present invention provides a flow-through support frame for a pleated filter medium which can be injection molded or vacuum/pressure formed into any specified shape or size, and which exhibits a leak-proof edge seal around the periphery of the filter at the filter medium/frame junction.

This invention is preferably directed to a filter assembly suitable for use in filtering fluid streams comprised of water, air or other gases containing particulate or vapor contaminants which comprises, in combination, an enclosing support frame member exhibiting any known shape required for the intended end use of the assembly, defining a center flow-through opening. The frame member has an inwardly projecting sealing means running continuously in a horizontal plane along the entire inside surface of the frame. Preferably, the sealing means is integrally molded with the frame member, but may also be attached separately. This assembly has an upstream fluid inlet through which a contaminated fluid stream enters the assembly and a downstream fluid outlet through which a decontaminated fluid stream exits the assembly. A pleated filter medium corresponding in shape to the shape exhibited by the frame member, is positioned within the frame, across the opening, between the inlet and the outlet side of the assembly. The perimeter edge of the filter medium is attached to the frame along the sealing means upper or lower surface using a known welding process such as ultrasonic welding, radio frequency welding, hot welding or any other suitable welding process. The sealing means is preformed to have a shape corresponding to the shape of the lateral perimeter edge of the filter medium to ensure the formation of a leak-proof edge seal after welding occurs. The sealing means further serves as a reinforcing member located below or above the edge of the filter medium to resist deformation of pleat spacing which may occur due to the forces exerted by a fluid stream passing through such filter assemblies.

In an alternative embodiment, this invention is also directed to a filter assembly suitable for use in filtering fluid streams comprised of water, air or other gases containing particulate or vapor contaminants, which assembly is intended for use after insertion in a housing adapted to enclose the assembly. Such a housing may be of the type used within a vehicle or home air conditioning unit. Generally, this type of housing will have at least four sides and at least two opposing ends (usually four) defining a flow through opening or aperture through which a fluid stream will be directed for filtration. Such housings are typically provided with internal sealing devices such that the air flow will be prevented from leaking around the side edges of a filter assembly once positioned within the housing. Many known sealing devices are available such as a gasket arrangement utilizing foam or rubber to hold the filter assembly in place to prevent air leakage. Any suitable known sealing means may be used for this purpose.

In this embodiment, the filter assembly may comprise, in combination, two or more frame members having an inwardly projecting sealing means running continuously in a horizontal plane along the inside surface of each of said frame members, and a pleated filter medium adapted to conform in shape to the shape of the housing, which filter medium has at least two opposed pleated side edges. Each of the side edges is intended to be attached to one of the frame members along its sealing means using a known welding process. The sealing means is provided with a preformed shape corresponding to the shape of the pleated side edges of the filter medium to ensure the formation of an edge seal along each pleated or corregated side edge which seal is essentially leak-proof, such that the assembly will resist pleat deformation occurring due to the forces exerted by a fluid stream passing through the filter assembly once it is inserted within the housing. In this embodiment, the filter assembly is carefully sized to fit within the housing and must be shaped accordingly. Moreover, the frame members are preferably adapted to conform to the contours of the opposing ends present in the housing. Although this embodiment utilizes welding only for bonding the pleated sides of the filter medium to a frame member, such that the filter medium is only partially enclosed within the frame, it is within the scope of this invention to provide a sufficient number of frame members to completely enclose the filter medium. In either case, whether the filter medium is totally or partially framed, it may still be used by insertion into a housing.

In carrying out the method of making the filter assembly in accord with this invention, the support frame and filter medium are positioned on a base fixture provided to support the filter medium and the frame during welding. The upper surface of the base fixture is shaped to correspond to the pleat shape and spacing present within the filter medium, and the pleats present in the filter medium are aligned to rest on and be contiguous with the corresponding pleats present in the base fixture. The base fixture and filter medium are aligned and rigidly affixed below the welding apparatus. In carrying out the welding process, the contours of the ultrasonic welding horn must match the contours of at least one pleat present in the filter medium and base fixture so that a precise weld will be produced around the periphery of the pleated filter edge at the frame junction.

A preferred method used for welding the filter medium edge to the frame member comprises the following steps:

a. positioning the filter medium over a base fixture having its upper surface contoured to correspond to the pleat height and pleat spacing present in the filter medium and aligning the pleats present in the filter medium to rest on and be contiguous with the corresponding contours in the base fixture;

b. placing the frame member on top of the filter medium edge so that the sealing means bottom surface contacts and is contiguous with the top of the filter medium edge;

c. positioning a welding horn, adapted to have a size and shape corresponding to the pleat shape of at least one filter medium pleat, to be in contact with the top surface of the sealing means, thereby sandwiching the sealing means and filter medium edge between the welding horn and the base fixture; and d. contacting the top surface of the sealing means with an activated welding horn to effect a continuous weld at the interface between the filter medium edge and the sealing means.

An alternative preferred method used for welding the filter medium edge to the frame member comprises the following steps:

a. positioning the frame member over a base fixture having its upper surface contoured to correspond to the pleat height and pleat spacing present in the filter medium and aligning the pleats present in the sealing means to rest on and be contiguous with the corresponding contours in the base fixture;

b. placing the filter medium edge on top of the sealing means surface so that the sealing means top surface contacts and is contiguous with the bottom of the filter medium edge;

c. positioning a welding horn, adapted to have a size and shape corresponding to the pleat shape of at least one filter medium pleat, to be in contact with the top surface of the filter medium edge, thereby sandwiching the filter medium edge and sealing means between the welding horn and the base fixture; and d. contacting the top surface of the filter medium edge with an activated welding horn to effect a continuous weld at the interface between the filter medium edge and the sealing means.

Once the filter medium edges are aligned with the sealing means and the pleats of the filter medium are properly positioned within the corresponding contours formed into the base fixture, the welding operation may be initiated. After welding, the frame and the attached filter medium are removed from the base fixture. The finished assembly is generally ready for its final end use.

Using the inventive design and method of manufacture disclosed herein, the filter assembly can be formed of two or three simple parts which may be produced independently of each other and which may be assembled in a simple manner. In one preferred embodiment, the filter medium edge may be positioned directly below the sealing means such that the welding horn contacts the sealing means initially, and the filter edge is sealed along the lower surface of the sealing means. In an alternative preferred embodiment, the filter medium edge is positioned directly above the sealing means such that the welding horn contacts the filter medium edge initially and the filter edge is sealed along the upper surface of the sealing means.

For purposes of this application, ultrasonic welding will be described. However, it should be recognized that many types of known welding procedures would have utility, as long as the components of the filter assembly are manufactured from materials which are compatible for use with the welding technique employed. For example, when ultrasonic welding is employed, the filter medium, frame and sealing means and any other components to be bonded by welding will need to be fully compatible with respect to ultrasonic welding capability.

Accordingly, it is an object of this invention to provide an improved process for joining a pleated filter medium edge to a frame member to provide an essentially leak-proof edge seal.

It is a further object of this invention to provide a filter assembly in which the filter medium is welded to the frame along the entire pleated perimeter edge of the filter medium.

It is still another object of this invention to provide a filter medium which is capable of high volume production and which does not require the use of adhesives.

It is a further object of this invention to provide a disposable filter assembly which is simple in design, rugged in construction, and economical to manufacture.

It is a further object of this invention to provide a pleated filter assembly having reinforced pleats which resist deformation during the filtration process.

It is a further object of this invention to provide a pleated filter assembly exhibiting a variety of shapes including, but not limited to, square, rectangular, trapezoidal, circular or elliptical.

DETAILED DESCRIPTION OF THE PREFERRED EMBODIMENTS

Figure 1:
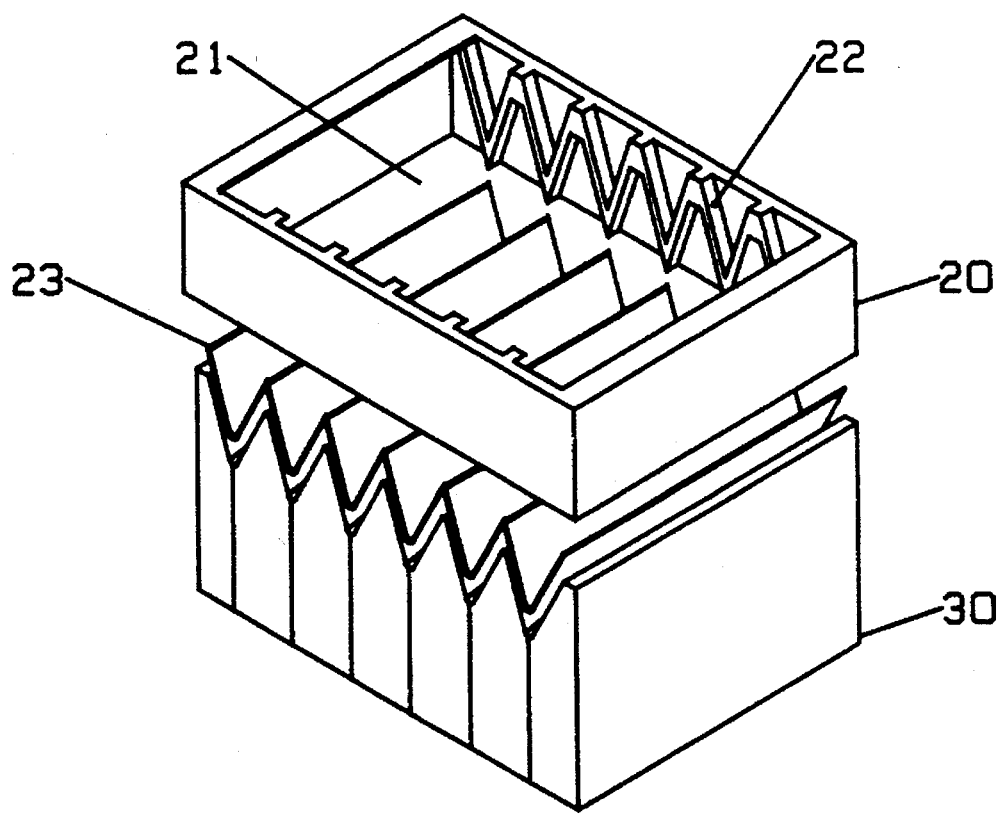
FIG. 1 is an exploded top plan view of a preferred filter assembly positioned above the production base fixture prior to welding.
Figure 4:
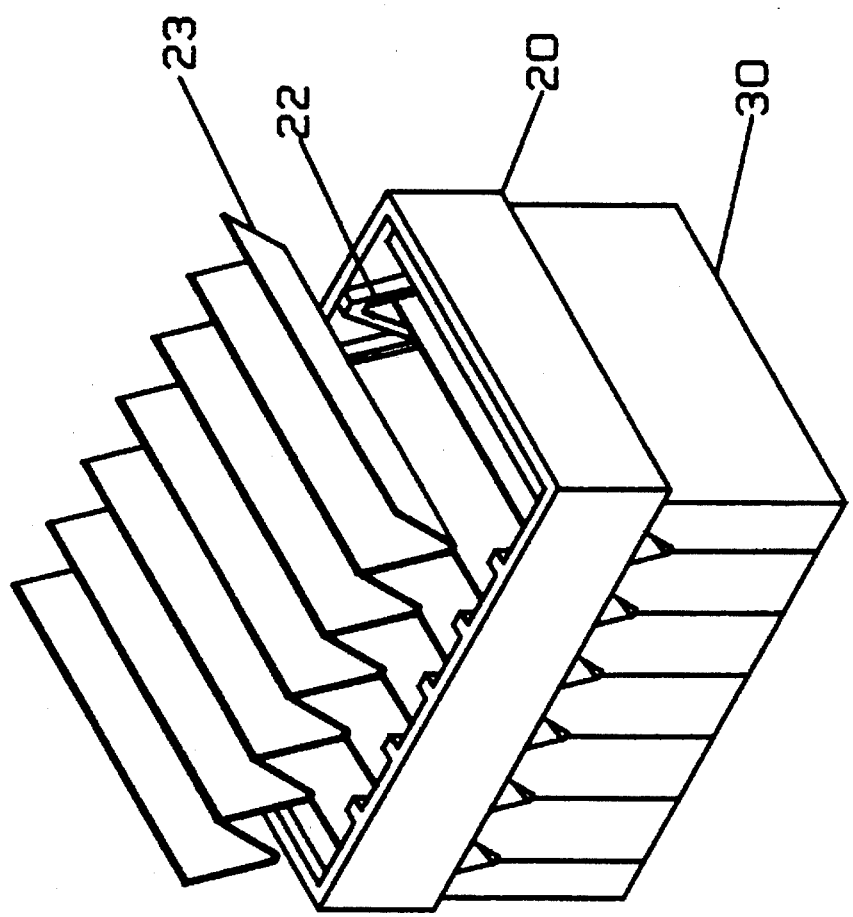
FIG. 4 is an exploded top plan view of another preferred embodiment of the filter assembly prior to welding.

With reference to the drawing figures, and in particular, FIGS. 1 and 4, the invention described herein, provides an improved filter assembly comprising, in combination, an enclosed frame, generally designated 20, which defines a center opening 21 having an inwardly projecting sealing means, 22, running continuously in a horizontal plane along the inside surface of frame 20, which sealing means has a preformed shape or contour corresponding to the shape of the lateral perimeter pleated edge of filter medium 23.

In FIG. 1 frame member 20 is shaped as a square and is provided with an inwardly over hanging upper edge surface perpendicular to the frame wall. In addition, sealing means 22 is "V" notched to correspond to the pleated side edges of the filter medium. However, the upper-most surface or peak of the sealing means is flattened to present an essentially smooth upper surface. Such an embodiment would typically be used where the filter assembly is intended for installation into a compact area requiring an essentially flat outer surface. More typically, however, frame member 20 will have the appearance shown in FIG. 4, without any over hanging perpendicular top surface. In addition as shown in FIG. 4, the sealing means upper most surface follows the contours of the pleated filter medium edge forming one or more peaks which may extend to the top vertical edge of the frame member.

Although the assembly is depicted as a square, it is to be understood that the frame member and filter medium may be provided with any known shape including, but not limited to, square, rectangular, trapezoidal, circular or elliptical.

Support frame member 20 provides a rigid support to the filter medium. It may or may not be flanged (or contain a recess to accommodate a gasket) for sealing purposes.

Sealing means 22 formed on the inside surface of frame member 20 may take on a variety of shapes as shown in FIGS. 6 through 9.

Figure 6:
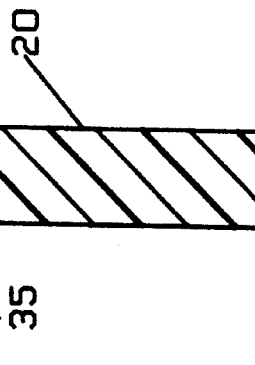
FIG. 6 is a vertical sectional view cut through the frame member and sealing means showing one embodiment of the sealing means attached to the frame member.
Figure 7:
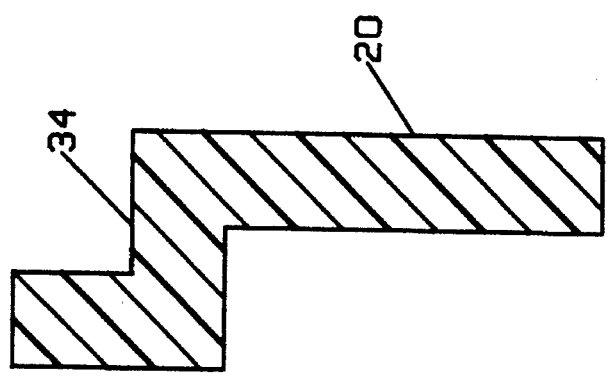
FIG. 7 is a vertical sectional view showing an alternative embodiment of the sealing means attached to the frame member.
Figure 8:
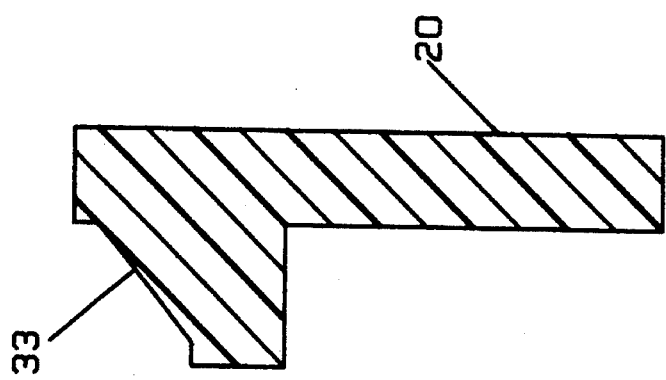
FIG. 8 is a vertical sectional view showing another alternative embodiment of the sealing means attached to the frame member.
Figure 9:
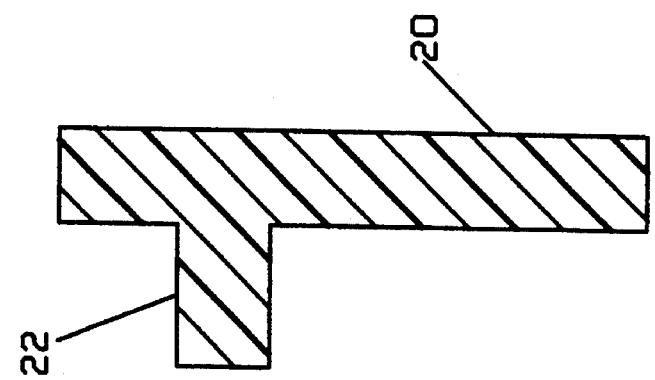
FIG. 9 is a vertical sectional view showing another alternative embodiment of the sealing means attached to the frame member.

FIG. 6 illustrates a cross sectional view of frame member 20 and sealing means 22 showing the sealing means to be an inwardly protruding straight edge portion perpendicular to the frame member. In this configuration, the welding horn may contact the sealing means from above or below to effect the desired weld. In FIG. 7 sloping surface 33 is provided on sealing means 20 such that this configuration is intended to contact the welding horn on the flat perpendicular underside edge surface. FIG. 8 depicts and embodiment wherein the welding horn may make contact either on the upper or lower surface of the flat horizontal portion 34 of sealing means 20. FIG. 9 corresponds to an alternative embodiment of FIG. 6 wherein an energy concentrating surface or peak 35 has been formed into the lower edge of sealing means 20. Such an energy concentrating surface may be optionally employed to expedite the welding process and may be beneficial where the edge sealing surface of the filter medium is particularly narrow.

The composition of the materials present in the sealing means must be compatible with the materials present in both the filter media and the frame member, which materials, in turn, must be physically compatible with the ultrasonic welding process. By physical compatibility is meant the ability to form a strong sinter or bond such that the shape and physical properties of the component parts of the filter assembly are unaffected. For example, for ultrasonic welding, it is essential that both the frame or the sealing means and the filter media be fully compatible with the ultrasonic welding process.

One embodiment of this invention would involve the use of a polypropylene frame material and a polypropylene filter medium, however, it is not necessary that the materials used in the filter medium be identical to that used in the frame member or comprise a predominant amount of any one material compatible with ultrasonic welding. It is only necessary that a sufficient amount of a compatible material be used in fabricating the filter medium such that once the fibers are blended to form the filter medium, the finished filter medium will exhibit compatibility. For example a blend of fibers consisting of 50% polypropylene fibers which are compatible with ultrasonic welding and 50% modacrylic fibers, which are not compatible with ultrasonic welding, may be woven together to produce a final filter medium which contains sufficient polypropylene to be rendered compatible to ultrasonic welding. In this example the polypropylene may be present in an amount between 20–80%, and preferably between 30–70% to generate a filter exhibiting sufficient compatibility for ultrasonic welding. This principle can be applied to a wide range of materials in the form of single polymer, blends or copolymers and the filter media may be fabricated from single fiber or multiple fiber types, in any form such as woven, knitted, nonwoven or laminated structures, but this invention should not be limited to these materials. It is within the scope of this invention to use polypropylene, polystyrene, ABS or nylon, all of which materials are compatible with ultrasonic welding. Similarly, when other welding processes are employed, the materials used would likewise require compatibility with the process selected.

The sealing means is preferably fabricated from the same material used in the frame member. The sealing means will typically be a rectangularly shaped narrow rib or ledge which is integrally formed into the inside surface of the frame using injection molding or may be formed by vacuum pressure into any specified shape. It is preferred that the sealing means have a vertical thickness of at least 0.089 centimeters to insure the formation of an appropriate edge seal. The width of the sealing means be may vary depending upon the shape and size of the ultrasonic welding horn. In general, it is preferred that the horizontal width of the sealing means be between 0.25 and 1.0 centimeters measured from the inner surface of the frame wall. Of course, the sealing means may exhibit a cross sectional shape other than rectangular or square provided sufficient surface area is available for weld contact.

The filter media is typically formed and pleated prior to the sealing process, but this could be done simultaneously therewith. The pleated filter media may be fabricated from sheets of suitable filtration material having the same thickness and density. However, it is often desirable to combine or layer filter sheets of filter materials that are of different densities and thicknesses, so that the lower density material may be employed to trap large particles of unwanted contaminants, and the higher density materials may be employed to trap fine particles. In addition, the filter medium may be formed into a "filter pack" assembly consisting of two or more diverse filter materials. The filter or filter pack may also have a plastic support net (commonly known as a scrim) affixed to one or both sides of the filter media outer or inner layers or to one or more sides of a multi layered filter material. Such scrims provide added strength to the filter medium and are particularly beneficial when a flimsy filter material is employed.

The completed filter medium or filter pack is dimensionally defined using the criteria of pleat height, pleat length, pleat spacing and number of pleats per centimeter or inch. Generally speaking as more densely packed pleats are employed, it becomes increasingly more difficult to employ sealing methods utilizing welding for effecting a leak proof seal. However, in accord with the present invention it has been found that for typical industrial applications wherein the pleat number is between about 0.4 and 2 pleats per centimeter, it is possible to effect a highly secure seal around the perimeter of the pleated filter surface using specially designed welding horns having head arrangements sized to correspond to the individual pleat spacing required for a given filtration application. Generally, several different horns will be required corresponding to differing pleat height, width and length arrangements. However, within the pleat spacing ranges set forth above, a leak-proof seal is possible using a welding process with an appropriately designed welding head.

The combination of the dimensional factors required for any given filter medium depends upon the total surface area needed in the finished filter. Accordingly, such dimensions will vary based upon the physical restraints of the media selected and the performance requirements for the end product, particularly with respect to filtration efficiency and air flow resistance. Optionally, the pleated ends may be crimped to ensure proper contact with the sealing means along the sealing surface.

Figure 10:
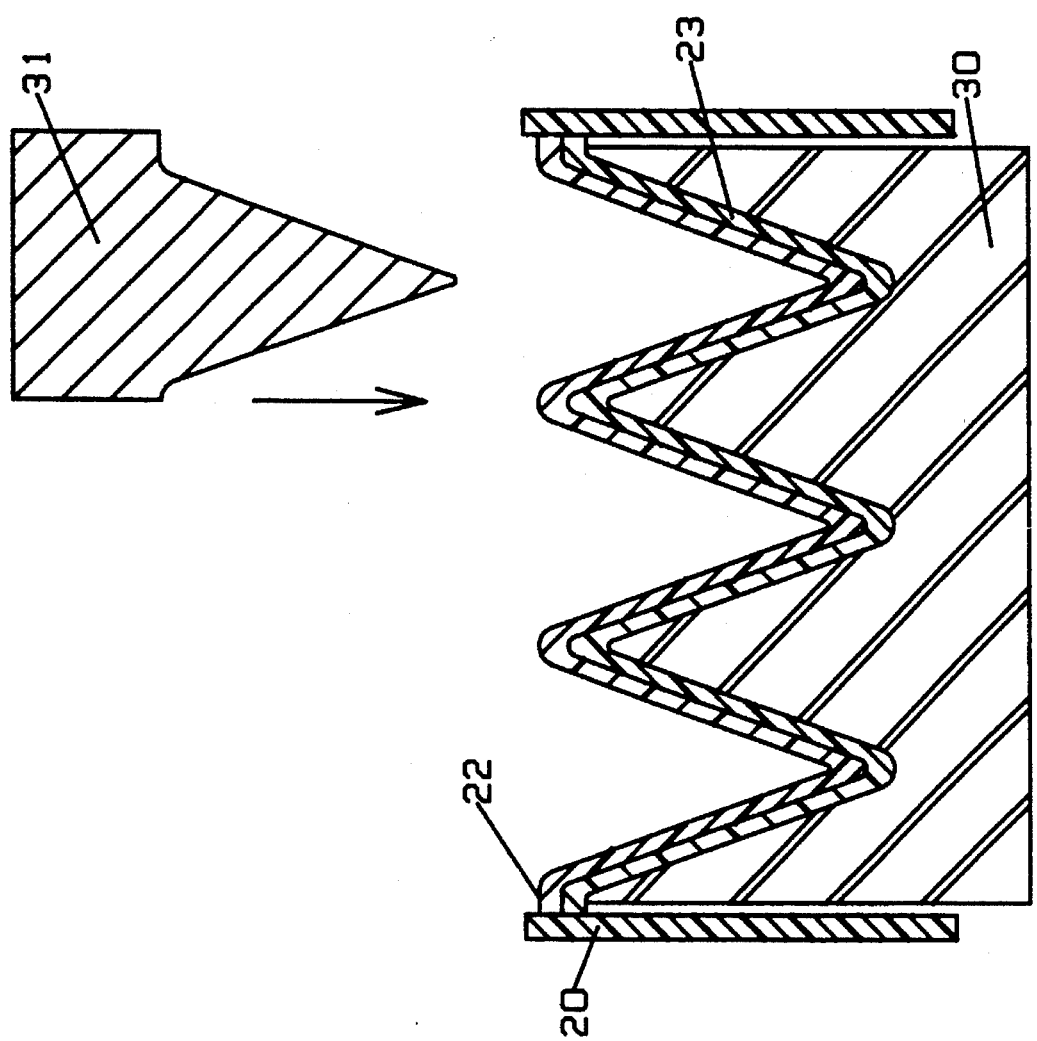
FIG. 10 is a transverse sectional view showing the positioning of the filter assembly parts as they are welded together on the base fixture in one of the preferred methods of production.
Figure 11:
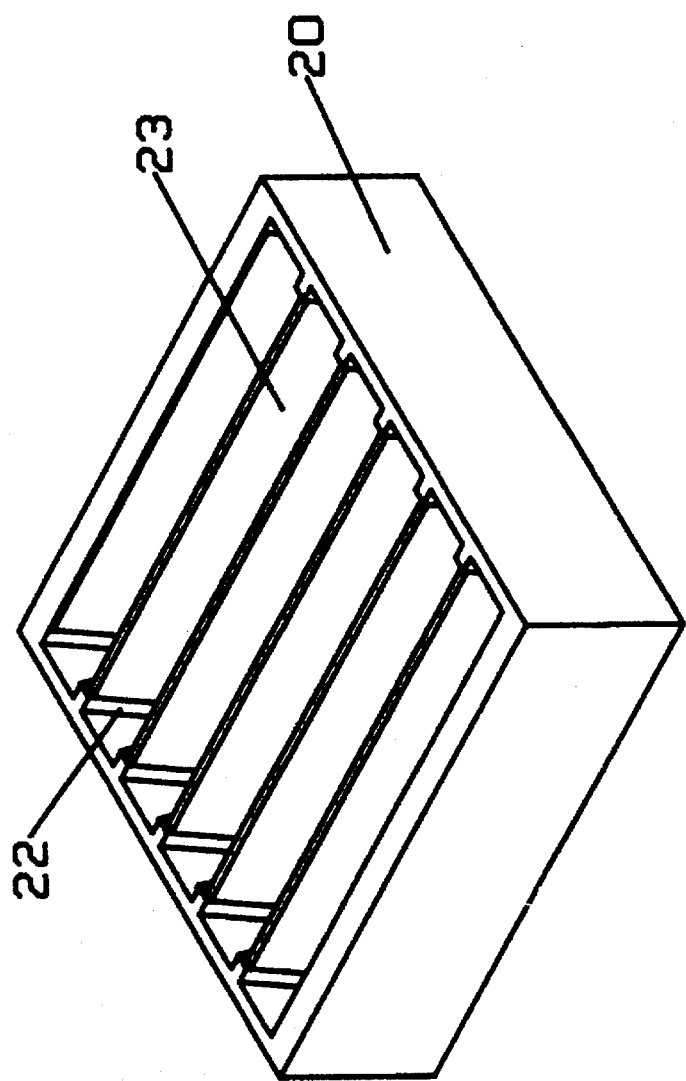
FIG. 11 is a perspective view of one embodiment of a completed filter assembly.

In accordance with the method of this invention, and as shown in FIG. 10, the support frame member 20 and filter medium 23 are positioned over base fixture 30 provided to support the filter medium and the frame member during welding. Base fixture 30 is "V" notched or corrugated to form alternating ridges (peaks) and grooves (recesses) which are complimentary to the filter pleat spacing and shape, and is aligned and rigidly fixed below the welding apparatus.

The method of manufacturing the filter assembly disclosed herein will be directed to the use of ultrasonic welding systems. However, as stated above, other known welding processes may be used in carrying out the production process.

Figure 2:
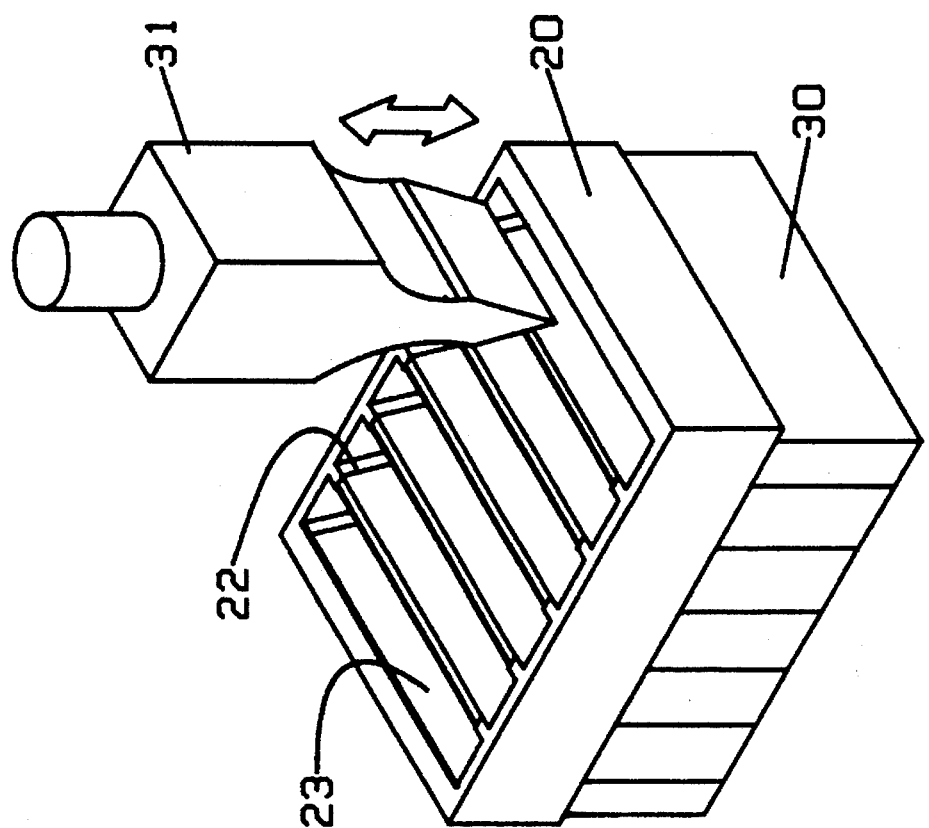
FIG. 2 is an upstream perspective view of the filter assembly during welding Which provides an enlarged view of one possible configuration for the welding horn.
Figure 3:
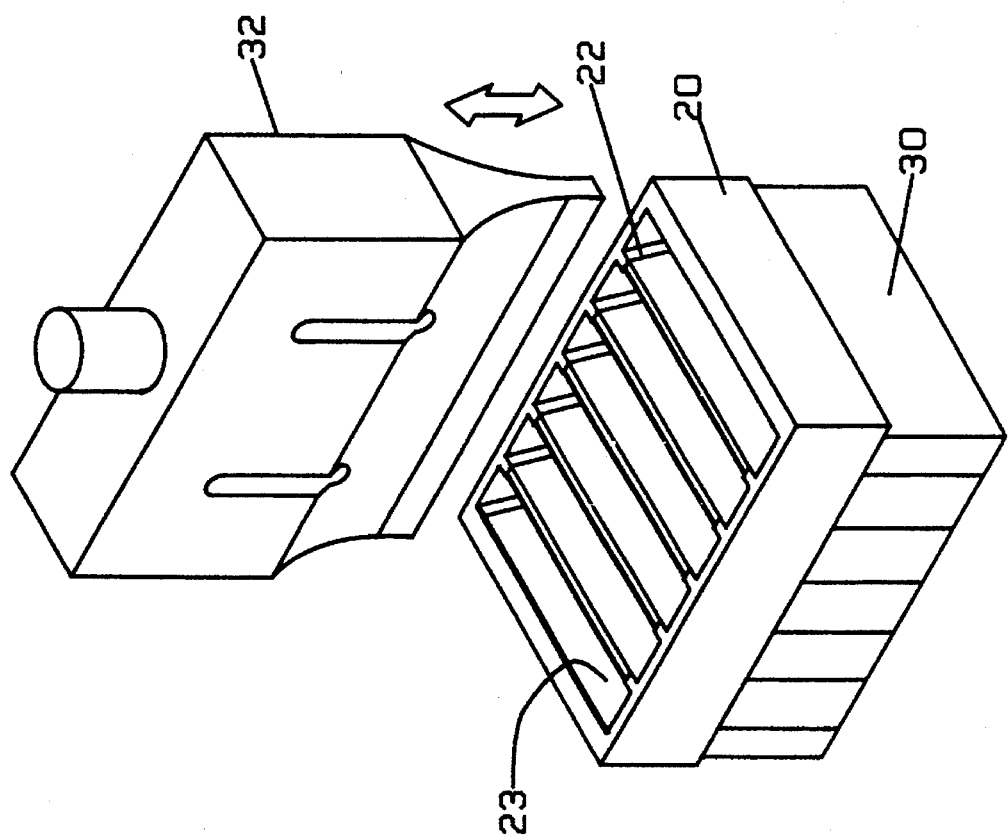
FIG. 3 is an upstream perspective view of a filter assembly during welding which provides an enlarged view of an alternate welding horn configuration.

An ultrasonic welding system consists of five basic components: power supply, converter, booster horn, horn and base fixture. The horn is the apparatus that contacts the filter media edge and forms the weld. Two different embodiments of the horn are shown in FIGS. 2 and 3, designated 31 and 32.

Figure 5:
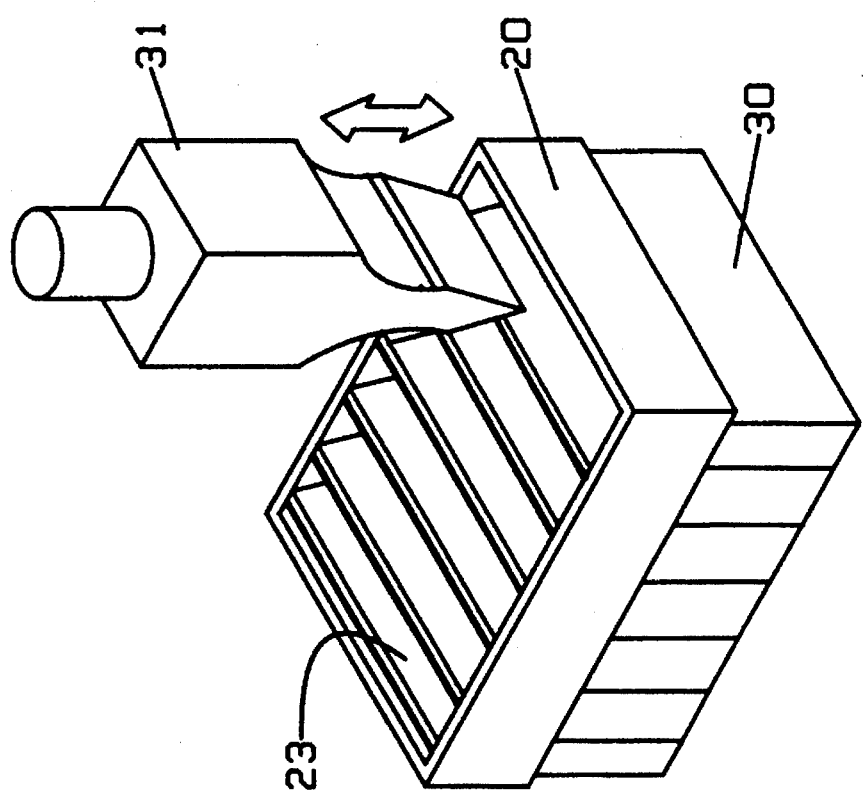
FIG. 5 is an upstream perspective view of the filter assembly which provides an enlarged view of an alternative design for the welding horn.

In carrying out the welding process, the contours of the ultrasonic welding horn must match the contours of the pleats present in the filter medium and base fixture, so that a precise weld and leak-proof edge seal will be produced around the periphery of the pleated filter medium at the frame junction. Therefore, the mating surface of the welding horn will typically be "V" shaped or "S" shaped to correspond to the contours of the filter medium and sealing means as shown in FIGS. 2, 5 and 10. Alternatively, the horn contact surface may be flat so that it contacts only the top surface of the sealing means as shown in FIG. 3. The sealing means and welding horn mating surface may be knurled or be provided with one or more pointed edges serving as an energy directing surface to focus the ultrasonic energy into a narrow band. For small filters the welding horn may consist of a single "V" notch corresponding to one pleat in the filter medium. This configuration is shown in FIGS. 2, 5 and 10. For larger assemblies the "V" shaped horn may be provided with a flat bottom surface and be of a sufficient size to contact the upper-most surface or pleat peak of several pleat edges as shown in FIG. 3.

A preferred method for producing the assembly shown in FIGS. 1 and 10 which may be used for welding the filter medium edge to the frame member comprises the following steps:

a. positioning the filter medium over a base fixture having its upper surface contoured to correspond to the pleat height and pleat spacing present in the filter medium and aligning the pleats present in the filter medium to rest on and be contiguous with the corresponding contours in the base fixture;

b. placing the frame member on top of the filter medium edge so that the sealing means bottom surface contacts and is contiguous with the top of the filter medium edge;

c. positioning a welding horn, adapted to have a size and shape corresponding to the pleat shape of at least one filter medium pleat, to be in contact with the top surface of the sealing means, thereby sandwiching the sealing means and filter medium edge between the welding horn and the base fixture; and d. contacting the top surface of the sealing means with an activated welding horn to effect a continuous weld at the interface between the filter medium edge and the sealing means.

Still another preferred method for producing the assembly shown in FIG. 4 for welding the filter medium edge to the frame member comprises the following steps:

a. positioning the frame member over a base fixture having its upper surface contoured to correspond to the pleat height and pleat spacing present in the filter medium and aligning the pleats present in the sealing means to rest on and be contiguous with the corresponding contours in the base member;

b. placing the filter medium edge on top of the sealing means surface so that the sealing means top surface contacts and is contiguous with the bottom of the filter medium edge;

c. positioning a welding horn, adapted to have a size and shape corresponding to the pleat shape of at least one filter medium pleat, to be in contact with the top surface of the filter medium edge, thereby sandwiching the filter medium edge and sealing means between the welding horn and the base fixture; and d. contacting the top surface of the filter medium edge with an activated welding horn to effect a continuous weld at the interface between the filter medium edge and the sealing means.

The following Example more clearly illustrates a specific embodiment of this invention.

EXAMPLE 1

The filter pack material is prepared by laying the filter medium and scrim together, co-pleating them to the appropriate pleat height in a continuous process and cutting to size. The frame element is injection molded. The pleated filter medium is inserted into the base fixture, aligned correctly and then the frame member is fitted over the filter medium edge. For this example the frame and scrim are polypropylene and the filter medium is 50% polypropylene. The frame measures 30.48×18.52 cm with an overall height of 3.18 cm and a wall thickness of 0.15 cm. The sealing means vertical thickness is 0.1 cm and the sealing means width measured from the side of the frame wall is 0.64 cm. Pleat length is 30.18 cm, pleat height 3 cm and the pleat spacing is 1 per cm. [The process parameters are more fully described in Table A set forth below.]

The "V" shaped weld seal is accomplished sequentially, one notch at a time with the vertical face of the horn parallel and 0.012 cm away from the inside of the frame wall. The ultrasonic welder (manufacturer, Ultra Sonic Seal, Broomall, Pa., Model Number PT2020LE and Linear Activator, Gold Booster) is set with a time based cycle and an actuator cylinder pressure of 45 psi, a weld time of 0.5 seconds and a hold time 0.1 seconds in order to weld the components together.

TABLE A

| Process Parameters | |
|---|---|
| Material Specifications: | |
| Frame: | Polypropylene |
| Media: | Polypropylene, 45 gm/sq. meter and Modacrylic, 45 gm/sq. meter |
| Scrim: | Polypropylene |
| Physical Dimensions: | |
| Frame | |
| Length: | 30.48 cm 12.000" (parallel to pleat) |
| Width: | 18.52 cm 7.290" (perp. to pleat) |
| Overall Height: | 3.18 cm 1.250" |
| Wall Thickness: | 0.15 cm 0.060" |
| Ledge | |
| Shape: | Rectangular |
| Thickness: | 0.10 cm 0.040" |
| Height: | 0.64 cm 0.250" |
| Filter Medium | |
| Pleat Length: | 30.18 cm 11.880" |
| Pleat Height: | 3.00 cm 1.180" |
| Pleat Spacing: | 2.56 pleats" |
| Number of Pleats: | 18 |
| Process Equipment: | |
| Ultrasonic Welder | |
| Manufacturer: | Ultrasonic Seal |
| Address: | 398 Read Road Broomall, PA 19008 |
| Model Number: | PT2020LE with Linear Actuator |
| Operating Frequency: | 20 kHz |
| Booster: | Gold |
| Welder Settings | |
| Operation Mode: | Time based cycle with time delay trigger |
| Actuator Cylinder Pressure: | 45 psi |
| Weld Time: | 0.50 sec. |
| Hold Time: | 0.10 sec. |
| Welding Fixture Configuration | |
| Base Fixture: | Qty (17 Inverted V's & (2) half V's bolted to a rigid base plate |
| Horn Design: | a) Single V, machined to suit pleat b) Flat horn, face dim's- 4" ×. 3.75" |
| Assembly Configuration: | Filter media between sealing means and base fixture; |

A second weld horn having a flat contact surface is then used to weld the straight edges of the first and last pleat of the filter medium to the corresponding flat surface of the sealing means to complete the sealed filter assembly.

It is envisaged that the entire process could be automated readily for large scale production to give good reproducibility and low manpower costs.

It is to be understood that the specific embodiments disclosed herein are illustrative only. Other embodiments of this invention will be apparent to those having ordinary skill in the art as being embodied in the scope of the following claims:

What is claimed is:

1. A filter assembly comprising, in combination:

an enclosed frame defining a center opening, and having an inside surface, an upstream fluid inlet and a downstream fluid outlet and an inwardly projecting sealing means running continuously in a horizontal plane along the inside surface of said frame;

a pleated filter medium positioned in said frame across said center opening between said inlet and said outlet, having its lateral perimeter edge welded to said frame along said sealing means, wherein said sealing means has a preformed shape corresponding to the shape of the lateral perimeter edge of said filter medium to ensure the formation of a leak-proof edge seal and to resist pleat deformation.

2. The filter assembly of claim 1, wherein said perimeter edge of the pleated filter medium is welded to the frame using a welding process selected from the group consisting of ultrasonic welding, radio frequency welding and hot welding.

3. The filter assembly of claim 2, wherein said sealing means is a rectangularly shaped rib having a vertical thickness of not less than 0.089 centimeters.

4. The filter assembly of claim 3, wherein said sealing means is integrally formed into the inside surface of said frame.

5. The filter assembly of claim 2, wherein said filter medium comprises one or more layers of fibrous woven or non-woven single polymers, co-polymers, or blends of polymers and co-polymers fabricated to render such medium compatible with the welding process.

6. The filter assembly of claim 5, wherein said enclosed frame, sealing means and pleated filter medium are fabricated from a sufficient amount of polypropylene to render said enclosed frame, sealing means and pleated filter medium compatible with the welding process.

7. The filter assembly of claim 6, wherein said filter medium, is faced on both sides with a polypropylene scrim.

8. The filter assembly of claim 7 wherein said sealing means is provided with an energy directing means.

9. The filter assembly of claim 8, wherein said filter medium edge is positioned directly above said sealing means.

10. The filter assembly of claim 9 wherein said assembly exhibits a shape selected from the group consisting of square, rectangular, circular, trapezoidal and elliptical.

11. The filter assembly of claim 8, wherein said filter medium edge is positioned directly below said sealing means.

12. The filter assembly of claim 11 wherein said filter assembly exhibits a shape selected from the group consisting of square, rectangular, circular, trapezoidal and elliptical.

13. The filter assembly of claim 1, wherein the perimeter edge of the pleated filter medium is ultrasonically welded to the frame along said sealing means.

14. A filter assembly, adapted for insertion within a housing and adapted to be sealed along the perimeter of said housing said housing having at least four sides and at least two opposing ends defining a flow-through opening, the filter assembly being sized to fit within said housing, and comprising, in combination, two or more frame members having an inwardly projecting sealing means running continuously in a horizontal plane along the inside surface of each of said frame members; a pleated filter medium adapted to conform in shape to the shape of said housing, having at least two opposed pleated side edges, each of which is welded to respective ones of said frame members along said sealing means, wherein said sealing means has a preformed shape corresponding to the shape of the opposed pleated side edges of said filter medium to ensure the formation of an edge seal which is essentially leak-proof and which will resist pleat deformation occurring due to forces exerted by a fluid stream passing through said filter once said assembly is inserted within said housing.

15. The filter assembly of claim 14, wherein said at least two opposed pleated side edges are welded to respective ones of said frame members using a welding process selected from the group consisting of ultrasonic welding, radio frequency welding and hot welding.

16. The filter assembly of claim 15, wherein said sealing means is a rectangularly shaped rib having a vertical thickness of not less than 0.089 centimeters.

17. The filter assembly of claim 16, wherein said sealing means is integrally formed into the inside surfaces of said frame members.

18. The filter assembly of claim 17, wherein said filter medium comprises one or more layers of fibrous woven or non-woven single polymers, co-polymers, or blends of polymers and co-polymers fabricated to render said medium compatible with the welding process.

19. The filter assembly of claim 18, wherein said filter assembly comprises frame members, a sealing means and a filter medium fabricated from a sufficient amount of polypropylene to render said frame members, sealing means and filter medium compatible with the welding process.

20. The filter assembly of claim 19, wherein said filter medium, is faced on both sides with a polypropylene scrim.

21. The filter assembly of claim 20 wherein said sealing means is provided with an energy directing surface.

22. The filter assembly of claim 21, wherein said filter media edge is positioned directly above said sealing means.

23. The filter assembly of claim 22 wherein said filter assembly exhibits a shape selected from the group consisting of square, rectangular, circular, trapezoidal and elliptical.

24. The filter assembly of claim 21 wherein said filter media edge is positioned directly below said sealing means.

25. The filter assembly of claim 24 wherein said filter assembly exhibits a shape selected from the group consisting of square, rectangular, circular, trapezoidal and elliptical.

26. The filter assembly of claim 14, wherein said pleated side edges are ultrasonically welded to said frame members.

27. A method for sealing the pleated perimeter edge of a filter medium to a frame member having an inwardly projecting sealing means running continuously in a horizontal plane along the inside surface of said frame member wherein said sealing means has a preformed shape corresponding to the contours of the lateral perimeter edge of the filter medium using welding techniques to form a filter assembly, comprising:

a. positioning the filter medium over a base fixture having its upper surface contoured to correspond to the pleat height and pleat spacing present in the filter medium and aligning the pleats present in the filter medium to rest on and be contiguous with the corresponding contours in the base fixture;

b. placing the frame member on top of the filter medium edge so that the sealing means bottom surface contacts and is contiguous with the top of the filter medium edge;

c. positioning a welding horn, adapted to have a size and shape corresponding to the pleat shape of at least one filter medium pleat, to be in contact with the top surface of the sealing means, thereby sandwiching the sealing means and filter medium edge between the welding horn and the base fixture; and d. contacting the top surface of the sealing means with an activated welding horn to effect a continuous weld at the interface between the filter medium edge and the sealing means.

28. The method of claim 27 wherein the continuous weld performed in step (d) is produced using ultrasonic energy.

29. A filter assembly made by the method of claim 28.

30. A method for sealing the pleated perimeter edge of a filter medium to a frame member having an inwardly projecting sealing means running continuously in a horizontal plane along the inside surface of said frame medium wherein said sealing means has a preformed shape corresponding to the contours of the lateral perimeter edge of the filter member using welding techniques to form a filter assembly, comprising:

a. positioning the frame member over a base fixture having its upper surface contoured to correspond to the pleat height and pleat spacing present in the filter medium and aligning the pleats present in the sealing means to rest on and be contiguous with the corresponding contours in the base fixture;

b. placing the filter medium edge on top of the sealing means surface so that the sealing means top surface contacts and is contiguous with the bottom of the filter medium edge;

c. positioning a welding horn, adapted to have a size and shape corresponding to the pleat shape of at least one filter medium pleat, to be in contact with the top surface of the filter medium edge, thereby sandwiching the filter medium edge and sealing means between the welding horn and the base fixture; and d. contacting the top surface of the filter medium edge with an activated welding horn to effect a continuous weld at the interface between the filter medium edge and the sealing means.

31. The method of claim 30 wherein the continuous weld performed in step (d) is produced using ultrasonic energy.

32. A filter assembly made by the method of claim 31.

33. A filter assembly, comprising:

a frame member having an inner and outer wall;

a filter medium having a perimeter and a pleated side edge along a portion of said perimeter;

a ledge located on the inner wall of the frame member, the ledge having a shape which conforms to the shape of the pleated side edge of the filter medium; wherein the pleated side edge of the filter medium is welded to the frame member along the ledge.

34. A filter assembly as defined in claim 33, wherein the ledge further includes an energy concentrating surface which facilitates the welding of the filter medium to the ledge.

35. A filter assembly, comprising:

a filter frame having first and second opposite side walls, the first and second opposite side walls having inner and outer surfaces;

a pleated filter medium having first and second pleated side edges;

a ledge located on each of the inner surfaces of the first and second opposite side walls, the ledge located on the first side wall has a shape which substantially conforms to the shape of the first pleated side edge and the ledge located on the second side wall has a shape which substantially conforms to the shape of the second pleated side edge; wherein the first pleated side edge of the filter medium is welded along the ledge located on the first side wall and the second pleated side edge is welded along the ledge located on the second side wall.

36. A filter assembly, as defined in claim 35, wherein the filter frame defines an enclosed frame which further includes third and fourth side walls having inner and outer surfaces;

the third and fourth side walls each having an inwardly overhanging upper edge surface substantially perpendicular thereto; wherein the pleated filter medium includes first and second non-pleated side edges, the first non-pleated side edge is welded to the inwardly overhanging upper edge surface of the third side wall and the second non-pleated side edge is welded to the inwardly overhanging upper edge surface of the fourth side wall.

* * * * *

UNITED STATES PATENT AND TRADEMARK OFFICE
CERTIFICATE OF CORRECTION

PATENT NO. : 5,512,172
DATED : April 30, 1996
INVENTOR(S) : Keith S. Marble

It is certified that error appears in the above-identified patent and that said Letters Patent is hereby corrected as shown below:

column 3, line 7, please delete "(usually four)"
Column 10, line 25, please replace " 2.56 pleats" " with
--2.56 pleats per inch--

Signed and Sealed this

Tenth Day of September, 1996

Attest:

BRUCE LEHMAN

*Attesting Officer*     *Commissioner of Patents and Trademarks*